July 13, 1965    A. E. EVANSON    3,194,434
SUPPLYING METERED QUANTITIES OF LIQUID
Filed Jan. 17, 1963    2 Sheets-Sheet 1
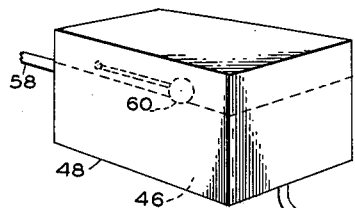
FIG. 1
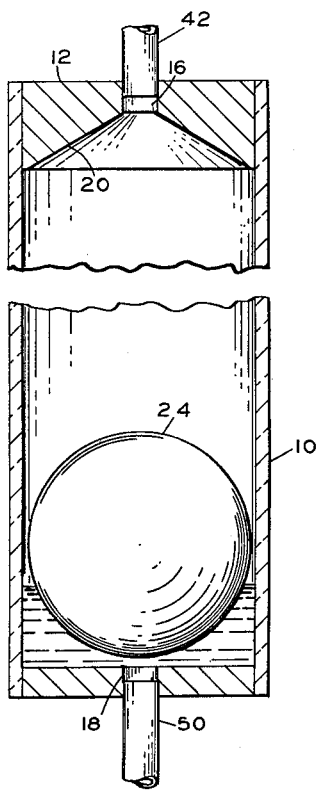
FIG. 2
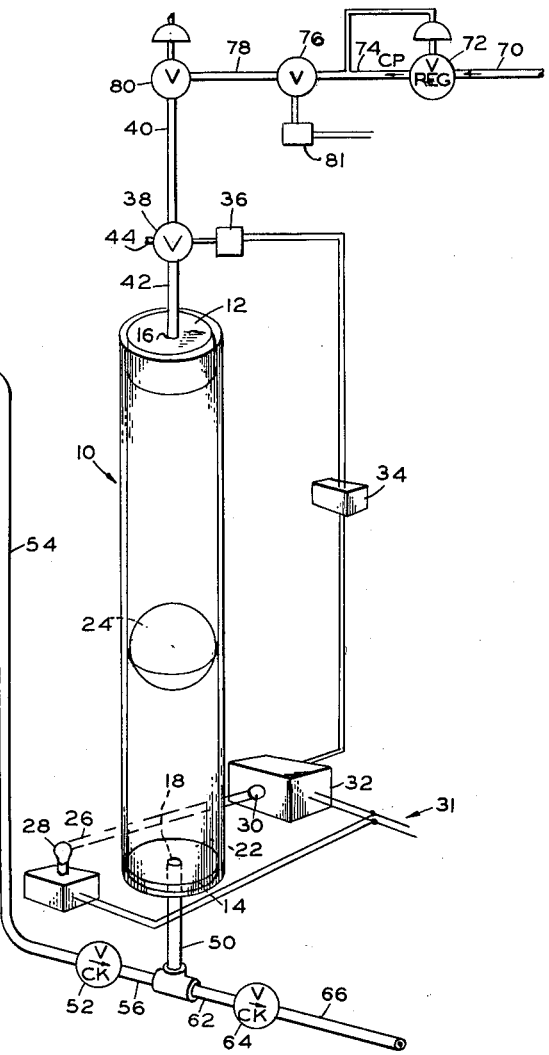
INVENTOR.
AUSTIN E. EVANSON
BY
BUCKHORN, BLORE, KLARQUIST & SPARKMAN
ATTORNEYS July 13, 1965  A. E. EVANSON  3,194,434
SUPPLYING METERED QUANTITIES OF LIQUID
Filed Jan. 17, 1963  2 Sheets-Sheet 2

INVENTOR.
AUSTIN E. EVANSON
BY
BUCKHORN, BLORE, KLARQUIST & SPARKMAN
ATTORNEYS

United States Patent Office 3,194,434
Patented July 13, 1965

3,194,434
SUPPLYING METERED QUANTITIES
OF LIQUID
Austin E. Evanson, 1033 N. 11th St., Corvallis, Oreg.
Filed Jan. 17, 1963, Ser. No. 252,150
11 Claims. (Cl. 222—1)

This invention relates to methods of and apparatus for supplying metered quantities of liquid, and more particularly to methods of and apparatus for handling corrosive liquids.

In the various types of chemical metering pumps which are now in use, there is some form of sliding reciprocating or rotating parts, some of which are necessarily in contact with the fluid to be pumped. These parts are subject to wear because of the relative motion therebetween, and they also must be made of chemically inert materials if the pumped liquid is chemically active. Such constructions are complex, expensive and are difficult to fabricate, particularly where the moving parts for such devices require close tolerances. Further, wear and corrosion tend toward leakage and inaccuracy of metering the liquid.

An object of the invention is to provide new and improved metering methods and apparatus.

Another object of the invention is to provide apparatus for metering a chemically active liquid and having no moving parts affecting the metering which are in contact with the liquid being metered.

A further object of the invention is to provide a method of metering a chemically active liquid by alternately filling a chamber of a predetermined volume with the liquid to be metered and discharging the chamber with metered gas introduced therein.

Another object of the invention is to provide a simple, inexpensive and effective device for delivering and metering chemically active liquids to a system under pressure.

Another object of the invention is to provide methods of and apparatus for delivering chemically active liquids at a uniform rate of flow.

In methods and apparatus illustrating certain features of the invention, a chemically active liquid to be metered may be introduced into a chamber of a predetermined volume to fill the chamber, after which a gas which is inert to the liquid and the apparatus is supplied to the chamber at a pressure sufficiently high to force the liquid in the chamber therefrom. Preferably the chamber is provided with a bottom opening into which liquid may be introduced and taken from the chamber, a top opening directly above the bottom opening and a check valve member which floats on the top of the liquid. The metering is accomplished by alternately filling and emptying the chamber. The delivery of the liquid from the chamber may be effected by a gas such as air or other chemically inert gas, which preferably is introduced into the chamber at a constant rate so that the discharge of the liquid is also at a constant rate of flow. There also is preferably provided sensing means responsive to the arrival of the check valve member at the bottom opening to relieve the pressure of the gas in the chamber so that the chamber may be refilled by a source of the liquid to be metered. The control means also may be adapted to connect a source of gas to the top opening after the float member reaches the top opening, at which time the chamber is filled with liquid, so as to supply the gas under a constant rate of flow to the top opening of the chamber to again move the liquid out of the chamber.

A complete understanding of the invention may be obtained from the following detailed description of methods and apparatus forming specific embodiments thereof, when read in conjunction with the appended drawings, in which:

FIG. 1 is a schematic view of an apparatus forming one embodiment of the invention;

FIG. 2 is an enlarged, fragmentary vertical section of a measuring chamber forming a portion of the apparatus of FIG. 1;

Figure 3:
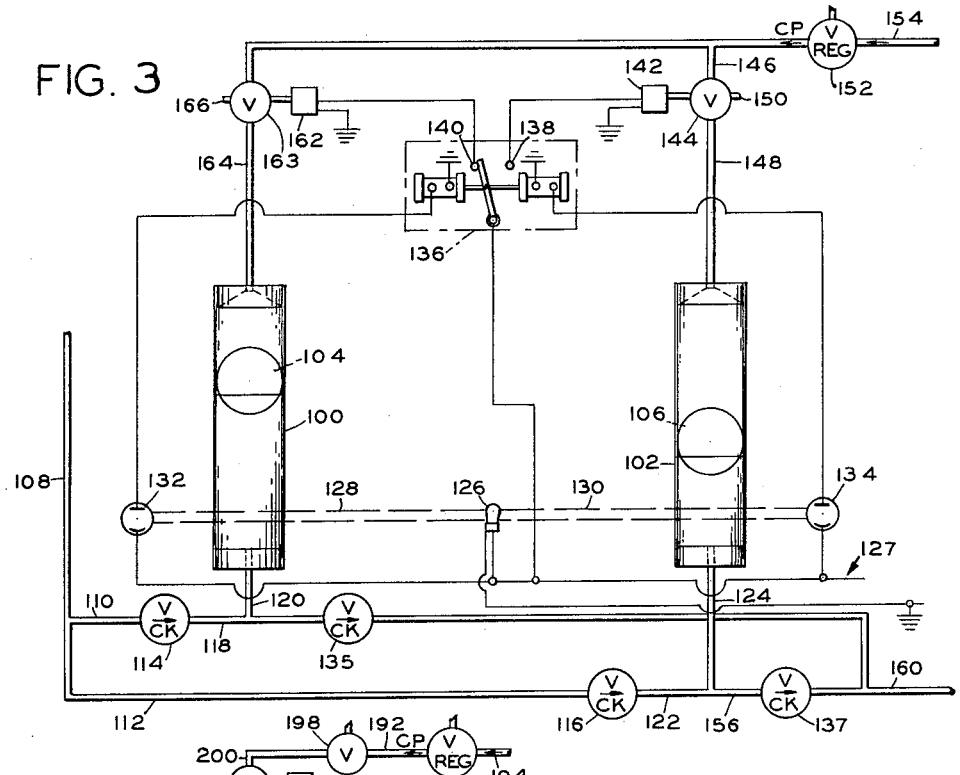
FIG. 3 is a schematic view of an apparatus forming an alternate embodiment of the invention.

Referring now in detail to FIGS. 1 and 2 of the drawing, there is shown therein a vertically disposed, transparent chamber 10 which may be made in cylindrical or tubular form and has end closing members or plugs 12 and 14 fixed thereto. The plugs 12 and 14 have passageways 16 and 18, respectively, the top plug 12 preferably having a tapered, valve seat portion 20. When the chamber 10 is filled with liquid to be metered, an opaque ball float member 24 seats against seat portion 20 to close off the passageway 16. Adjacent one side of the lower end of the chamber 10 is a light source 28 focused upon a photocell 30 mounted on the opposite side of the chamber so that the light beam 26 will be interrupted by the interposition of the float member 24. This darkens a photocell 30 of a known switching device 32 to actuate the switching device 32 to actuate a known time delay relay 34. Preferably the switching device is sensitive to radiation in the infra red range and the radiation from lamp 28 has a substantial proportion in the infra red range, whereby the switching device is operable with liquids to be pumped of limited translucency. A powerline 31 supplies electrical power to the photocell 30, the switching device 32 and the relay 34.

The relay 34 when energized immediately closes the circuit to the solenoid winding 36 to energize the winding 36 and actuate a known three-way valve 38 to close off a supply conduit 40 from a conduit 42 communicating with the passageway 16. Actuation of the valve 38 also connects the conduit 42 to a port 44 of the valve 38 opening into the atmosphere. This relieves pressure in the chamber 10 to permit liquid 46 in a reservoir 48 positioned above the top of the chamber 10 to flow into and fill the chamber 10 through a conduit 50 connected to the passageway 18 from a check valve 52 and conduits 54 and 56. A supply line 58 and a known float control 60 maintain the level of the liquid 46 in the reservoir 48 substantially constant so that the liquid on the left-hand side of the valve 52, as viewed in FIG. 1, is under a small predetermined pressure, preferably about one foot water column as measured from the under side of the top plug 12.

The time delay relay 34 keeps the solenoid winding 36 energized and the upper end of the chamber 10 connected to the atmosphere until the liquid being metered raises the float 24 into sealing engagement with the valve seat 20, and shortly thereafter resets to de-energize the solenoid winding 36. When the solenoid winding 36 is de-energized the valve 38 is in a condition connecting the conduit 40 to the conduit 42 and closing off the port 44 from these conduits. This connection of the conduits 40 and 42 causes a gas chemically inactive to the liquid to be supplied under pressure to the upper end of the chamber 10 to force the liquid out of the chamber 10 and through the conduit 50, a conduit 62 and a check valve 64, and a conduit 66 connected to a system under a pressure which may vary somewhat but is always greater than that of the pressure of the liquid in the conduit 54. When the liquid in chamber 10 lowers sufficiently that the ball 24 again breaks the beam of light 26, the switching device 32 actuates the relay 34 to energize the solenoid 36 immediately to close off the conduit 40 and open the conduit 42 to the port 44 communicating with the atmosphere, and the gas under pressure in the upper end of the chamber 10 is relieved so that the liquid from the tank 48 refills the chamber 10.

The gas under pressure is supplied to the conduit 40 from a supply conduit 70 leading from a source of the gas under a pressure substantially greater than twice the maximum pressure of the system to which the conduit 66 is connected. The gas travels from the conduit 70 through a known pressure regulating device 72 which produces the pressure of the gas to a predetermined pressure at least slightly over twice the pressure of the liquid in the conduit 66, a conduit 74, timer regulated or pulsated shutoff valve 76 of a known construction, a conduit 78 and an adjustable, calibrated orifice or valve 80 of known construction. The valve 80 meters the flow of the gas therethrough to a uniform rate of flow, as explained hereinafter, to expel the liquid from the chamber 10 and into the conduit 66. The adjustable and calibrated variable orifice or valve 80 may be operated by a pneumatic, electrical or hydraulic signal originating in any standard form of automatic controller, so as to control the rate of discharge in accordance with some preset rate, or in accordance with a varying rate of flow of some other fluid or in accordance with a prearranged program or in any desired manner. The variable orifice or valve 80, in commercial designs which are readily available, can normally be adjusted to provide any selected uniform rate of flow through the orifice within a range of about fifty to one. This range can be extended either by varying the gas pressure upstream of the orifice or by installing therein the power operated shut-off valve 76 which is operated by a known percentage timer 81 in accordance with a variable and preset time cycle alternately opening and closing. By this means the orifice 80 may be set to pass a fixed rate of flow in cubic feet per minute but the time during which this passage is permitted is varied, thus varying the total flow. If required the pulsing time of this secondary control may also be controlled from an automatic controller and a secondary control over the pumping rate established in accordance with some other variable in accord with which it may be necessary to control pumping rate. For operation within the above-mentioned range of flow between fifty to one, the valve 76 is maintained continuously open.

As mentioned previously, the pressure of the gas at the regulator 72 should be at least twice the maximum pressure of the system into which the chamber 10 discharges. The purpose of this is because under such conditions the flow rate of gas into the chamber 10 will be constant even though some variation in pressure may occur in the system into which the chamber 10 is discharging. Thus minor changes in pressure such as might be caused by variations in the frictional resistance to flow of liquid through the conduit 66 will have negligible effect on the rate of discharge of liquid from the chamber 10. On the other hand, if the pressure differential is less than two any changes in the discharge pressure will, as is well known, affect the rate of gas flow through the valve 80, thus materially affecting the rate of discharge of liquid from the chamber 10.

Preferably the volume of the interior of the conduit 40 is equal to the free volume between the valve 38 and the liquid in the chamber 10 when the ball 42 is seated against the seat 20. It will be apparent that during the period the chamber 10 is filling the pressure in the conduit 40 will rise substantially to the pressure of the line 78 or to a pressure about double that in the conduit 66.

Upon operation of the valve 38 to start a pumping cycle the gas in the conduit 40 will expand into the conduit 42 and space above the liquid in the chamber 10. This doubling of the volume of the gas will, of course, decrease its pressure by a factor of one-half so that all of the gas between the valve 80 and the liquid in the chamber 10 is about at the pumping pressure. This permits pumping of the liquid from the chamber 10 to commence substantially immediately upon operation of the valve 38 without waiting for a flow of gas through the valve 80.

In case the chamber 10 is made of an opaque material or in case the liquid to be pumped is opaque, the interruption or closing of the electrical circuit required to actuate the time delay relay 34 and the solenoid 36 may be effected by magnetism, as by embedding a magnet (not shown) in the float 24, or by induction as by making the float of magnetic material and causing it to pass into the field of a coil or coils wound around the outside of the lower part of chamber 10 or placed in close proximity to the chamber. The change in the magnetic or electric field so occasioned may be caused to make or break another known magnetic or inductive responsive switching device (not shown) corresponding to the switching device 32.

Measurement of the flow may be accomplished by connecting an electrical impulse counter to the photoelectric device 32 or to the circuit controlled by the relay 34. Since each operation of either of these devices signifies the completion of one cycle, and thus the discharge of one full chamber of the liquid being pumped, the count of the number of impulses provides an exact record of the volume of liquid discharged by the pump.

In the simple form so far described there is a necessary interruption in the delivery of liquid during the time when the chamber is refilling from the supply. In cases where completely uniform discharge is required, this may be obtained by a simple modification of the design described above as by the metering apparatus shown in FIG. 3. This apparatus includes a pair of chambers 100 and 102, which are identical with the chamber 10 and are so controlled as to be alternately discharged and filled with the liquid to be metered. The chambers 100 and 102 have controlling ball float valve members 104 and 106, respectively. In this apparatus the liquid to be metered is supplied under a predetermined pressure from a source of liquid (not shown) such as the tank 48 to a conduit 108, conduits 110 and 112, check valves 114 and 116, and conduits 118, 120, 122 and 124. A source of light 126 energized by powerline 127 sends beams 128 and 130, respectively, through the lower ends of the transparent chambers 100 and 102 to photoelectric control devices 132 and 134, except when the beam 128 or 130 is interrupted by the float valve member 104 or 106, which occurs as the corresponding chamber 100 or 102 is emptied through a check valve 135 or a check valve 137.

When the chamber 100 is emptied to a predetermined extent such that the float valve member 104 interrupts the light beam 128, the photoelectric cell 132 is actuated to actuate a known relay 136 to break contacts 138 and make contacts 140. When the contacts 138 are broken, a solenoid winding 142 is de-energized to actuate a valve 144 to connect conduits 146 and 148 and block off or isolate these conduits from discharge port 150. Then air or gas under pressure is supplied to a metering orifice or valve 152 from a source 154 of air under a predetermined pressure, and the air is metered to a predetermined rate of flow and is supplied to the upper end of the chamber 102 to evacuate the chamber 102 through the conduit 124, conduit 156, check valve 137 and a discharge conduit 160 having the liquid therein under a predetermined maximum pressure less than half that of the predetermined pressure in the conduit 154.

As the contact 140 is made, solenoid winding 162 is energized to actuate a valve 163 to connect conduit 164 to discharge port 166 opening into the atmosphere. This relieves the pressure of the gas in the chamber 100 and the chamber 100 is filled with liquid from the conduit 108 until the ball float member 104 closes the upper end of the chamber 100, at which time the chamber 100 is filled.

The system is arranged so that this occurs more rapidly than the discharge of the liquid from the chamber 102 and the chamber 100 remains filled until the chamber 102 is emptied, at which time the ball float member 106 breaks the light beam 130 to actuate the photoelectric control device 134 to actuate the relay 136 to break the contacts 140 and make the contacts 138. This reverses the procedure and the gas under the discharge pressure is supplied to the upper end of the chamber 100 at a metered rate to force the liquid from the chamber 100. Also, the conduit 148 is connected to the atmosphere so that the chamber 102 is refilled with liquid from the supply conduit 108. Thus the liquid under a predetermined flow is supplied continuously to the discharge conduit 160, with either the chamber 100 or the chamber 102 being emptied at any instant, and a continuous, constant rate of flow is effected.

Figure 4:
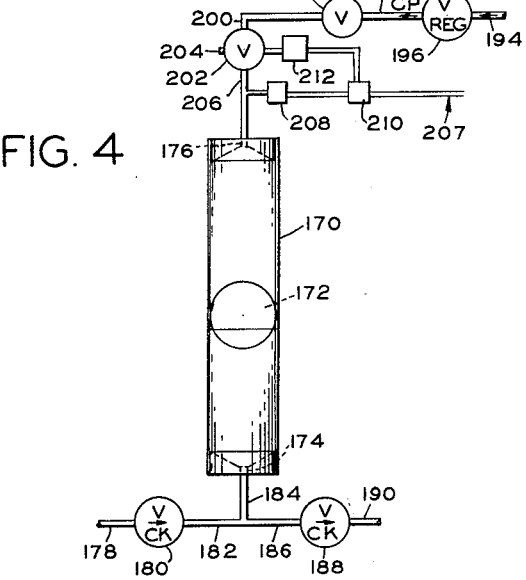
FIG. 4 is a schematic view of an apparatus forming an alternate embodiment of the invention.

The metering apparatus shown in FIG. 4 has a chamber 170 generally similar to the chamber 10 and having therein a ball float valve member 172 adapted to close a bottom valve opening 174 when the chamber 170 is empty of the liquid to be metered and to close upper opening 176 when the chamber 170 is filled with the liquid to be metered. The liquid to be metered is supplied to the chamber 170, as in the apparatus of FIG. 1, through a supply conduit 178, a check valve 180 and conduits 182 and 184. The liquid is discharged from the chamber 170 to the conduit 184, the conduit 186, the check valve 188 and a discharge conduit 190. Air or an inert gas under a pressure over twice that of the liquid in the conduit 190 is supplied to a conduit 192 from a conduit 194 leading to a suitable known source (not shown) through a known pressure regulating device 196. The air under pressure flows from the conduit 192 through an adjustable metering valve or orifice 198, a conduit 200, a valve 202, and a conduit 206 into the upper end of the chamber 170. The valve 202 has an exhaust port 204 connected to the atmosphere. A known pressure responsive switch 208 is connected to the interior of the conduit 206, and when the chamber 170 is emptied and the ball 172 closes the opening 174, the pressure of the gas in the chamber 170 and the conduit 206 builds up to actuate the switch 208. The switch 208, when actuated, actuates time delay relay 210 to energize solenoid 212. Electrical power is supplied by powerline 207. Normally the valve 202 connects the conduit 200 to the conduit 206 with the port 204 being closed. However, upon energization of the solenoid 212, the valve 202 is actuated to close off the conduit 200 and connect the conduit 206 to the port 204 leading to the atmosphere. This relieves the pressure of the gas in the chamber 170, and the liquid from the conduit 178, which is under pressure greater than that of the atmosphere, flows into the chamber 170 to fill the chamber, the time delay relay 210 maintaining the energization of the valve 212 until after the chamber 170 is filled with the liquid to be metered. Shortly after the chamber is filled, the relay 210 de-energizes the solenoid 212 and the valve 202 resets to close off the port 204 and connect the conduit 206 to the conduit 200. The emptying of the chamber 170 at a uniform rate of flow of the liquid then is again accomplished with the liquid flowing to the discharge conduit 190.

The above described methods and apparatus serve to deliver the liquid at a uniform rate of flow and precisely meter the liquid without contact by the liquid of any of the apparatus above the upper openings in the metering chambers. The only movable parts which come into contact with the chemically active liquid are check valves and the chamber constructions, and these are composed of any suitable material which is inert to the liquid. Thus, by utilizing gas under pressure and controlling the gas by the known flow control devices, very precise metering may be effected, even though the liquid being pumped is highly active chemically or corrosive.

The objectionable features of the prior art devices are not present in the above-described methods and apparatus, which do not utilize any pistons, plungers, diaphragms, impellers or the like and which are not mechanically driven. Futhermore the accuracy of metering or regulation is in no way dependent upon the maintenance of close tolerances in the dimensions of the parts of the apparatus either absolutely or in relation to each other. Therefore the apparatus may be constructed of materials selected primarily for their resistance to the chemical activity of the pumped fluid or their ease of fabrication or for any other desired property of the materials without regard to their suitability for service as mechanically moving parts.

In the methods and apparatus of the invention, the metering is accomplished by the repeated filling and emptying of a chamber or chambers of predetermined volume. The metering accuracy is therefore limited only by the accuracy with which the chamber volume can be determined.

It is to be understood that the above-described arrangements are simply illustrate of the application of the principles of the invention. Numerous other arrangements may be readily devised by those skilled in the art which will embody the principles of the invention and fall within the spirit and scope thereof.

What is claimed is:

1. The method of metering a liquid comprising
providing a supply of gas under a predetermined pressure,
restraining flow of a liquid from a chamber with a back pressure less than one-half of said predetermined pressure,
continuously supplying said gas from said supply to said chamber,
and continuously reducing the pressure of the gas as the gas is applied to said chamber to a second predetermined pressure less than half that of said predetermined pressure and higher than said back pressure and metering the flow of the gas to the chamber at a constant uniform rate to force the liquid from the chamber at a uniform metered rate of flow irrespective of changes in said back pressure.

2. In a device for supplying liquid to a system under a first predetermined pressure,
an accumulating chamber having a bottom opening and a top opening,
means including a check valve for supplying liquid under a second predetermined pressure greater than that of the atmosphere to the bottom opening to fill the chamber,
a source of gas under a pressure greater than twice as great as said first predetermined pressure of said system,
metering valve means connected to the source of gas under pressure,
control valve means connected continuously to the top opening and adapted to connect the top opening to the metering valve means when in a first condition and connect the top opening to the atmosphere when in a second condition,
means connecting said system to the bottom opening whereby liquid is supplied to said system when gas is supplied to the chamber through the metering valve means and the control valve means,
liquid level responsive means operable when the liquid reaches a predetermined low level in the chamber to actuate the control means from said first condition to said second condition to refill the chamber,
and means operable after the liquid has reached a predetermined high level in the chamber to actuate the control means from said second condition to said first condition.

3. In a liquid supplying device,
an accumulating chamber having a bottom opening and a top opening,
means including a check valve for supplying liquid under a predetermined pressure greater than that of the atmosphere to the bottom opening to fill the chamber, receiving means having therein liquid under a second predetermined pressure greater than said predetermined pressure, check valve means connecting the receiving means to the bottom opening to permit flow from the chamber to the receiving means only when the liquid in the chamber is subjected to a pressure greater than said second predetermined pressure, a source of gas under a pressure at least twice as great as said second predetermined pressure, metering valve means connected to the source of gas under pressure, control valve means connected continuously to the top opening and adapted to connect the top opening to the metering valve means when in a first condition and connect the top opening to the atmosphere when in a second condition, liquid level responsive means operable when the liquid reaches a predetermined low level in the chamber to actuate the control means from said first condition to said second condition to refill the chamber, and means operable after the liquid has reached a predetermined high level in the chamber to actuate the control means from said second condition to said first condition.

4. In a liquid supplying device, a plurality of vertical chambers each having a top opening and a bottom opening, a plurality of valve means mounted in the chambers for opening and closing the openings therein, a source of liquid under a first predetermined pressure, a plurality of one-way valve means connecting the bottom openings of the chambers in parallel with one another and to the source of liquid, discharge means containing liquid under a second predetermined pressure higher than said first predetermined pressure, a plurality of one-way valve means connecting the bottom openings in parallel with one another to the discharge means for permitting flow of liquid from the bottom openings to the discharge means, a source of gas under a third predetermined pressure greater than twice said second predetermined pressure, connecting means including control valve means for alternately connecting the top openings to the source of gas, metering valve means positioned between the control valve means and the source of gas, and a plurality of liquid level sensing means operable to actuate the control valve means to connect the source of gas alternately to each chamber after that chamber has been filled with a liquid.

5. In a liquid supplying device, a plurality of vertical chambers each having a top opening and a bottom opening directly under the top opening, a plurality of float members each mounted in one of the chambers and movable between a position near to the bottom opening of that chamber and a position closing the top opening of that chamber, a source of liquid under a first predetermined pressure, a plurality of one-way valve means connecting the bottom openings of the chambers in parallel with one another and to the source of liquid, discharge means containing liquid under a second predetermined pressure higher than said first predetermined pressure, a plurality of one-way valve means connecting the bottom openings in parallel with one another to the discharge means for permitting flow of liquid from the bottom openings to the discharge means, a source of gas under a third predetermined pressure greater than twice said second predetermined pressure, connecting means including control valve means for alternately connecting the top openings to the source of gas, metering valve means positioned between the control valve means and the source of gas, and a plurality of sensing means each operable by one of the float members to actuate the control valve means to connect the source of gas to the chamber having the last-mentioned valve member after that chamber is filled and has moved the float valve member associated therewith to the top opening of that chamber.

6. In a liquid supplying device, a supply tank, supply means including a float-actuated device for keeping liquid in the tank under a predetermined pressure, a vertical, cylindrical, transparent chamber of a predetermined volume having a bottom plug having a bottom opening and a top plug having a top opening and also having frustoconical top valve seat means, conduit means including a check valve for supplying liquid from the supply tank to the chamber to fill the chamber when the pressure in the chamber is less than said predetermined pressure, a ball float member in the chamber adapted to seat on the top valve seat means when the chamber is full of liquid and movable to a position near the bottom plug when the chamber is empty of liquid, a discharge conduit means under a substantially constant second predetermined pressure greater than said first predetermined pressure, means including a second check valve for connecting the bottom opening to the discharge conduit means to permit flow from the chamber to the discharge conduit means when the pressure in the chamber exceeds said second predetermined pressure, a three-way valve having an inlet port, an outlet port and an exhaust port connected to the atmosphere and adapted alternately to connect the outlet port to the inlet port and the outlet port to the exhaust port, solenoid means operable when actuated to actuate the valve to connect the outlet port to the inlet port, means connecting the outlet port to the upper opening in the chamber, an adjustable, calibrated metering valve connected at its downstream side to the inlet port, a second valve connected to the upstream side of the reducing valve, means for periodically opening and closing the second valve, a source of gas chemically inert to the liquid and under a varying pressure substantially greater than twice said second predetermined pressure, and a pressure regulating valve for supplying from the source of gas to the second valve gas under a third constant pressure greater than twice that of said second predetermined pressure.

7. A device for supplying measured quantities of liquid at a constant rate of flow to a system having a maximum predetermined pressure, said device comprising a vertically extending chamber having a bottom opening, conduit means connecting said bottom opening to a system under a predetermined maximum pressure, gas supply means for providing a supply of gas under a pressure greater than twice that of said maximum predetermined pressure of said system, and means connecting said gas supply means to the top of said chamber including a metering valve for effecting discharge of gas from said supply means to said chamber at a constant rate of flow.

8. In a liquid metering apparatus,
a chamber having a top air inlet opening and a bottom opening,
means for supplying liquid to the chamber through the bottom opening,
float valve means for closing the top opening when the chamber is filled to a predetermined extent,
a first valve,
a first gas conduit having a predetermined volume connecting the valve to the air inlet opening,
a metering valve,
a second gas conduit connecting the metering valve to the first valve and having a volume equal to the volume of gas between the first valve and the top of the liquid when the chamber is filled to said predetermined extent,
means normally operable to hold the liquid in the chamber until a predetermined pressure is applied to the liquid and then permit discharge of liquid under said pressure,
and means for supplying gas under a pressure greater than twice said predetermined pressure to the metering valve.

9. In a liquid metering device,
a vertical, cylindrical, transparent chamber of a predetermined internal diameter,
a top plug member having a central inlet opening and a downwardly facing frustoconical valve seat surrounding the inlet opening and closing the upper end of the chamber,
a bottom plug member having an opening and closing the lower end of the chamber,
an opaque ball float in the chamber and having an external diameter less than said internal diameter of the chamber and movable freely vertically in the chamber and adapted to engage the valve seat to close the inlet opening,
a light source adapted to project a beam of light including infra red and visible portions of the spectrum horizontally through the lower end of the transparent chamber,
a photoelectric cell sensitive to the infra red rays and visible rays and positioned on the opposite side of the chamber from the light source for receiving light from the light source,
a supply tank of transparent fluid positioned at a level above the level of the chamber,
first conduit means including a check valve connecting the tank to the opening in the bottom plug member for supplying liquid from the supply tank to the chamber,
a receiving system under a predetermined maximum pressure to be supplied with liquid,
second conduit means including a second check valve connecting the receiving system to the opening in the bottom plug member for supplying liquid to the receiving system,
a source of gas under a variable pressure always substantially greater than twice said predetermined maximum pressure,
pressure regulating means receiving gas from the source of gas for regulating the pressure of the gas to a uniform pressure substantially greater than twice said predetermined pressure,
a percentage valve receiving gas from the pressure regulating means and alternately opened and closed,
an adjustable metering valve receiving gas from the percentage valve for metering the gas and reducing the pressure thereof to a pressure slightly greater than said predetermined maximum pressure,
a three-way valve having a first port, a second port and an exhaust port and operable between a first position connecting the first and second ports together and a second position connecting the second and exhaust ports together,
solenoid means for operating the three-way valve,
time delay relay means operable by the photocell when light to the photocell is cut off by the float to actuate the solenoid means to operate the three-way valve to said second position thereof to fill the chamber with liquid until the float engages the valve seat and thereafter actuate the solenoid means to operate the three-way valve to said first position,
third conduit means having a predetermined volume connecting the first port of the three-way valve to the metering valve,
and fourth conduit means connecting the second port of the three-way valve to the inlet opening in the top plug member,
the combined volume of the fourth conduit means, the inlet opening in the top plug member and the portion of the chamber filled with gas when the float is at the valve seat of the top plug member being substantially equal to said predetermined volume of the third conduit means so that when the three-way valve is operated to said first position thereof the pressure of the gas in the third conduit means is immediately reduced.

10. In a light metering device,
a vertical, cylindrical chamber of a predetermined internal diameter,
a top plug member having a central inlet opening and a downwardly facing frustoconical valve seat surrounding the inlet opening and closing the upper end of the chamber,
a bottom plug member having a central opening and an upwardly facing frustoconical valve seat surrounding the opening in the bottom plug member and closing the lower end of the chamber,
an opaque ball float in the chamber and having an external diameter less than said internal diameter of the chamber and movable freely vertically in the chamber and adapted to alternately engage the valve seats to close the openings,
a supply tank of fluid positioned at a level above the level of the chamber,
first conduit means including a check valve connecting the tank to the opening in the bottom plug member for supplying liquid from the supply tank to the chamber,
a receiving system under a predetermined maximum pressure to be supplied with liquid,
second conduit means including a second check valve connecting the receiving system to the opening in the bottom plug member for supplying liquid to the receiving system,
a source of gas under a variable pressure always substantially greater than twice said predetermined maximum pressure,
pressure regulating means receiving gas from the source of gas for regulating the pressure of the gas to a uniform pressure substantially greater than twice said predetermined pressure,
an adjustable metering valve receiving gas from the pressure regulating means valve for metering the gas and reducing the pressure thereof to a pressure slightly greater than said predetermined maximum pressure,
a three-way valve having a first port, a second port and an exhaust port and operable between a first position connecting the first and second ports together and a second position connecting the second and exhaust ports together,
solenoid means for operating the three-way valve,
third conduit means connecting the metering valve to the first port,
fourth conduit means connecting the inlet opening to the second port, a pressure responsive switch operable by increase in pressure in the fourth conduit means occurring after the valve float is seated on the valve seat of the bottom plug member, and time delay relay means operable by operation of the pressure operable switch device to actuate the solenoid means to operate the three-way valve to said second position thereof to fill the chamber with liquid until the float engages the top valve seat and thereafter actuate the solenoid means to operate the three-way valve to said first position.

11. In a liquid metering device, a pair of vertical, cylindrical, transparent chambers at the same level and each having a predetermined internal diameter, a pair of top plug members each having a central inlet opening and a downwardly facing frustoconical valve seat surrounding the inlet opening and closing the upper end of one of the chambers, a pair of bottom plug members each having an opening and closing the lower end of one of the chambers, a pair of opaque ball floats in the chambers and having an external diameter less than said internal diameter of the chambers and movable freely vertically in the chambers, a light source positioned between the chambers and adapted to project a beam of light horizontally through the lower ends of the transparent chambers, a pair of photoelectric cells positioned on the opposite sides of the chambers from the light source for receiving light from the light source, a supply tank of transparent fluid positioned at a level above the level of the chambers, first conduit means including a first pair of check valves connecting the tank to the openings in the bottom plug members for supplying liquid from the supply tank individually to the chambers, a receiving system under a predetermined maximum pressure to be supplied with liquid, a second conduit means including a second pair of check valves connecting the receiving system to the chambers for supplying liquid to the receiving system, a source of gas under a variable pressure always substantially greater than twice said predetermined maximum pressure, pressure regulating means receiving gas from the source of gas for regulating the pressure of the gas to a uniform pressure substantially greater than twice said predetermined pressure, a percentage valve receiving gas from the pressure regulating means and alternately opened and closed, an adjustable metering valve receiving gas from the percentage valve for metering the gas and reducing the pressure thereof to a pressure slightly greater than said predetermined maximum pressure, a pair of three-way valves each having a first port connected to the metering valve, a second port connected to one of the inlet openings and an exhaust port and operable between a first position connecting the first and second ports together, and a second position connecting the second and exhaust ports together, a pair of solenoid means for operating the three-way valves, and switch means operable by each of the photocells when light to that photocell is cut off by the float to actuate one of the solenoid means to operate one of the three-way valves to said second position thereof to fill the chamber having the last-mentioned float with liquid until the last-mentioned float engages the valve seat and to actuate the other solenoid means to operate the other three-way valve to said first position.

References Cited by the Examiner

UNITED STATES PATENTS

| 520,224 | 5/94 | Schroeder | 222—399 X |
|---|---|---|---|
| 884,017 | 4/08 | Hadank | 222—399 |
| 2,149,633 | 3/39 | Schnoor | 137—192 |
| 2,574,595 | 11/51 | Shaw | 141—153 |
| 2,582,387 | 1/52 | Macneish | 137—162 |
| 2,644,333 | 7/53 | Duus | 137—256 X |
| 2,755,966 | 7/56 | Lindars | 222—76 X |
| 2,783,920 | 3/57 | Negoro | 222—444 X |
| 2,895,649 | 7/59 | Dawson | 222—444 X |
| 2,954,045 | 9/60 | Leek | 222—23 X |
| 2,961,880 | 11/60 | Griswold | 222—444 X |
| 2,967,004 | 1/61 | Lipshuts et al. | 222—70 |
| 3,078,868 | 2/63 | Lamb | 222—334 X |

FOREIGN PATENTS

| 180,949 | 1/07 | Germany. |
|---|---|---|
| 208,540 | 1/25 | Great Britain. |

RAPHAEL M. LUPO, *Primary Examiner.*